US009674518B2

(12) United States Patent
Agrawal et al.

(10) Patent No.: US 9,674,518 B2
(45) Date of Patent: Jun. 6, 2017

(54) MEASURING REMOTE VIDEO DISPLAY WITH EMBEDDED PIXELS

(71) Applicant: VMware, Inc., Palo Alto, CA (US)

(72) Inventors: Banit Agrawal, Sunnyvale, CA (US); Lawrence Spracklen, Boulder Creek, CA (US); Rishi Bidarkar, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 435 days.

(21) Appl. No.: 14/137,515

(22) Filed: Dec. 20, 2013

(65) Prior Publication Data

US 2015/0181207 A1    Jun. 25, 2015

(51) Int. Cl.
*H04N 17/02* (2006.01)
*H04N 19/46* (2014.01)
*H04N 17/00* (2006.01)

(52) U.S. Cl.
CPC ............. *H04N 17/02* (2013.01); *H04N 19/46* (2014.11); *H04N 17/004* (2013.01)

(58) Field of Classification Search
CPC .. H04N 19/154; H04N 19/172; H04N 17/004; H04N 17/02
USPC ........................................................ 348/189
See application file for complete search history.

(56) References Cited

U.S. PATENT DOCUMENTS

| | | | |
|---|---|---|---|
| 7,106,347 B1 | 9/2006 | Rosenberg | |
| 7,233,336 B2 | 6/2007 | Mondal | |
| 8,127,233 B2 | 2/2012 | McDowell | |
| 8,341,624 B1 | 12/2012 | Hobbs | |
| 8,396,122 B1 * | 3/2013 | Taylor | H04N 19/176 375/240.03 |
| 8,453,148 B1 | 5/2013 | Hobbs | |
| 8,489,704 B1 | 7/2013 | Mendez | |
| 8,743,954 B1 * | 6/2014 | Masterson | 375/240.05 |
| 8,774,536 B1 | 7/2014 | Jia | |
| 8,902,248 B1 | 12/2014 | Bidarkar et al. | |
| 8,972,893 B2 | 3/2015 | Duncan | |
| 9,235,313 B2 | 1/2016 | Wu | |
| 2003/0099411 A1 | 5/2003 | Kokemohr | |

(Continued)

OTHER PUBLICATIONS

F. Lamberti and A. Sanna, "A Streaming-Based Solution for Remote Visualization of 3D Graphics on Mobile Devices," in IEEE Transactions on Visualization and Computer Graphics, vol. 13, No. 2, pp. 247-260, Mar.-Apr. 2007.

*Primary Examiner* — Michael Lee

(57) ABSTRACT

Methods, systems, and computer programs are provided for managing remote display performance. One method includes an operation for determining pixel data for a group of macroblocks, each macroblock having a group of pixels. The macroblocks are for embedding in respective video frames of a video stream. The pixel data for each pixel in each macroblock is calculated with a formula based on the frame number of the respective video frame and on the location of the pixel within the macroblock. Farther, the method includes operations for embedding the macroblocks in the respective video frames, and for transmitting the video frames with the embedded macroblocks to a remote client. A performance metric for the transmitted video stream is calculated based on the macroblocks received at the remote client by comparing the received macroblocks to the expected macroblocks based on the formula.

16 Claims, 8 Drawing Sheets

(56) References Cited

U.S. PATENT DOCUMENTS

| | | |
|---|---|---|
| 2004/0098731 A1 | 5/2004 | Demsey |
| 2004/0125110 A1 | 7/2004 | Kohda |
| 2004/0205514 A1 | 10/2004 | Sommerer |
| 2004/0255276 A1 | 12/2004 | Rovang |
| 2005/0010861 A1 | 1/2005 | Augustyn |
| 2005/0124389 A1 | 6/2005 | Yang |
| 2006/0078051 A1* | 4/2006 | Liang et al. .............. 375/240.24 |
| 2007/0009045 A1* | 1/2007 | Mohandas .............. 375/240.25 |
| 2007/0022144 A1 | 1/2007 | Chen |
| 2008/0155454 A1 | 6/2008 | Balasubramanian |
| 2009/0037774 A1 | 2/2009 | Rideout et al. |
| 2009/0128491 A1 | 5/2009 | Katayama |
| 2009/0153585 A1 | 6/2009 | Mahajan |
| 2009/0210817 A1 | 8/2009 | Schmieder |
| 2009/0222739 A1 | 9/2009 | Schmieder |
| 2009/0234940 A1* | 9/2009 | Pal et al. ...................... 709/224 |
| 2009/0319933 A1 | 12/2009 | Zaika |
| 2010/0007788 A1 | 1/2010 | Lee et al. |
| 2010/0020875 A1* | 1/2010 | Macq ...................... 375/240.13 |
| 2010/0064260 A1 | 3/2010 | Amano |
| 2010/0161711 A1 | 6/2010 | Makhija et al. |
| 2010/0162338 A1 | 6/2010 | Makhija |
| 2010/0290667 A1 | 11/2010 | Lienhart et al. |
| 2011/0010629 A1 | 1/2011 | Castro |
| 2011/0199389 A1 | 8/2011 | Lu |
| 2011/0249572 A1 | 10/2011 | Singhal et al. |
| 2011/0276900 A1 | 11/2011 | Khan |
| 2012/0042252 A1 | 2/2012 | Neerudu |
| 2012/0084774 A1 | 4/2012 | Post et al. |
| 2012/0206387 A1 | 8/2012 | Omura |
| 2012/0307074 A1* | 12/2012 | Bhagavathy et al. ........ 348/180 |
| 2013/0067331 A1 | 3/2013 | Glazer |
| 2013/0097426 A1 | 4/2013 | Agrawal |
| 2013/0132971 A1 | 5/2013 | Assuncao |
| 2013/0156100 A1 | 6/2013 | Matsui |
| 2013/0166629 A1 | 6/2013 | Ivashin |
| 2013/0187916 A1 | 7/2013 | Toy |
| 2013/0290856 A1 | 10/2013 | Beveridge |
| 2014/0153457 A1 | 6/2014 | Liu |
| 2014/0226901 A1 | 8/2014 | Spracklen |
| 2014/0320673 A1 | 10/2014 | Agrawal |
| 2015/0009222 A1 | 1/2015 | Diard |
| 2015/0019694 A1 | 1/2015 | Feng |
| 2015/0030084 A1* | 1/2015 | Marchya .............. H04N 17/004 375/240.26 |
| 2015/0043312 A1 | 2/2015 | Wu |
| 2015/0046852 A1 | 2/2015 | Furtwangler |
| 2015/0127716 A1 | 5/2015 | Agrawal et al. |
| 2015/0180933 A1 | 6/2015 | Spracklen et al. |
| 2015/0181207 A1 | 6/2015 | Agrawal et al. |
| 2015/0186102 A1 | 7/2015 | Yamaguchi |
| 2015/0194136 A1 | 7/2015 | Diard |
| 2015/0312599 A1 | 10/2015 | Brockmann |
| 2016/0073113 A1 | 3/2016 | Rintaluoma |

* cited by examiner

MEASURING REMOTE VIDEO DISPLAY WITH EMBEDDED PIXELS

BACKGROUND

In typical virtualized desktop infrastructure architectures, displays and input devices are local, and applications execute remotely in a server. The user's desktop is typically hosted in a datacenter or cloud, and the user remotely interacts with the user's desktop via a variety of endpoint devices, including desktops, laptops, thin clients, smart phones, tablets, etc. There are many advantages to this approach, including cost savings, improved mobility, easier management and deployment of applications, etc.

Remote display protocols are utilized to transfer the display of a remote desktop to the end-client. As applications executing in the desktop generate changes to the display, the remote display protocol transfers the display data to the remote client.

Measuring video quality at the remote display in real-time is a challenging problem in VDI environments. If the measurement is done on the client side, the client may not have context of what is the expected quality of a video being played because the video may be of poor quality, even before being sent to the remote display. Therefore, it may be difficult to determine if the quality received is high or low. Sometimes, user perception is used to measure quality, but user perception is subjective and requires human resources, which may not be practical in environments with hundreds or thousands of remote desktops.

It is in this context that embodiments arise.

SUMMARY

Embodiments provide methods, systems, and computer programs for measuring remote display performance and display quality. It should be appreciated that the present embodiments can be implemented in numerous ways, such as a process, an apparatus, a system, a device, or a method on a computer readable medium. Several inventive embodiments are described below.

In one embodiment, a method for measuring remote display quality is provided. The method includes an operation for determining pixel data for a plurality of macroblocks. Each macroblock has a plurality of pixels, and the macroblocks are defined to be embedded in respective video frames of a video stream. Further, the pixel data for each pixel in each macroblock is based on a frame number of a respective video frame and a location of the pixel within the macroblock. Additionally, the method includes operations for embedding the macroblocks in the respective video frames, and for transmitting the video frames with the embedded macroblocks to a remote client. A performance metric for the transmitted video stream is calculated based on the macroblocks received at the remote client. In one embodiment, the operations of the method are executed by a processor.

In another embodiment, a non-transitory computer-readable storage medium storing a computer program is presented. The computer-readable storage medium includes program instructions for calculating pixel data for a plurality of macroblocks, where each macroblock has a plurality of pixels. The macroblocks are defined to be embedded in respective video frames of a video stream, where the pixel data for each pixel in each macroblock is calculated based on a frame number of the respective video frame and a location of the pixel within the macroblock. The computer-readable storage medium further includes program instructions for embedding the macroblocks in the respective video frames, and program instructions for transmitting the video frames with the embedded macroblocks to a remote client. In addition, the remote client is configured to calculate a performance metric for the transmitted video stream based on the macroblocks received at the remote client.

In yet another embodiment, a method for measuring remote display quality is presented. The method includes an operation for receiving, at a client device, a plurality of video frames of a video stream. Each video frame includes a respective macroblock embedded in the video frame by a server, and each macroblock has a plurality of pixels. Further the method includes operations for identifying received pixel data for pixels of each received macroblock, and for determining expected pixel data for pixels of each received macroblock based on the frame number of the video frame and the location of the pixel within the macroblock. In another operation, the received pixel data is compared to the expected pixel data for a plurality of pixels to calculate a performance metric for the received video stream. C Other aspects of the embodiments will become apparent from the following detailed description, taken in conjunction with the accompanying drawings, illustrating by way of example the principles of the embodiments.

BRIEF DESCRIPTION OF THE DRAWINGS

The embodiments may best be understood by reference to the following description taken in conjunction with the accompanying drawings in which.

DETAILED DESCRIPTION

Methods, systems, and computer programs are presented for measuring remote display performance of a display of a remote desktop client. It should be noted, however, that the embodiments may be practiced without some or all of these specific details. In other instances, well known process operations have not been described in detail in order not to unnecessarily obscure the present embodiments.

Embodiments presented herein embed predefined macroblocks in video frames of a video stream. The macroblock includes a plurality of pixels and is one type of performance marker. The quality of the remote display is then measured by analyzing the received macroblocks as compared to the expected macroblocks. In one embodiment, the pixel values within each macroblock are calculated with a formula which is a function of frame number and the coordinates of each pixel within the macroblock.

Figure 1:
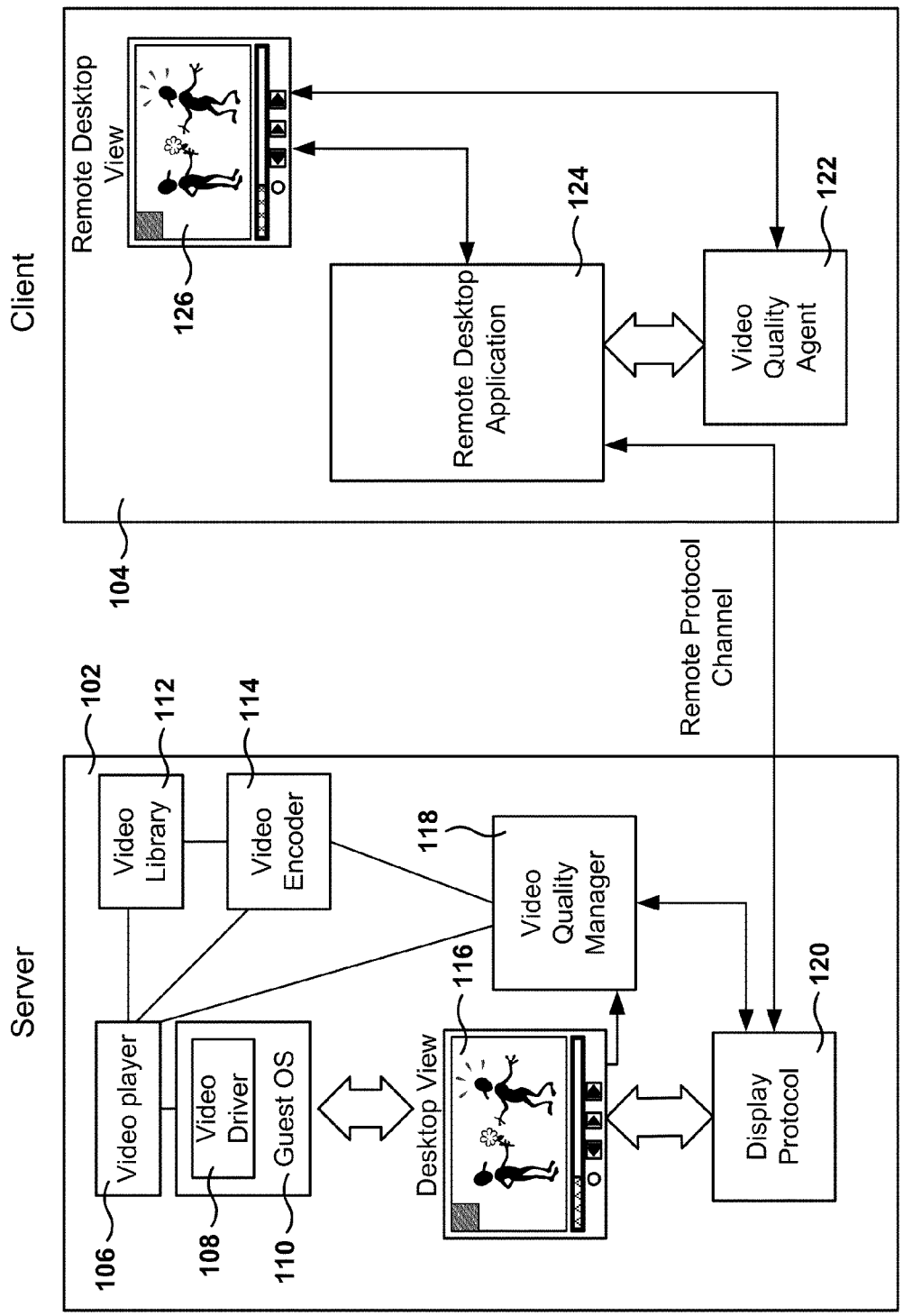
FIG. 1 shows an architecture for measuring remote display performance, in accordance with one embodiment.

FIG. 1 shows an architecture for measuring remote display performance, in accordance with one embodiment. A server 102 includes virtual machines executing on the server, which then transmits the display output to client 104. In the embodiment of FIG. 1, a video player 106 is executing in a virtual machine. A call by the video player 106 to a video driver 108, which executes within Guest Operating System (GOS) 110, causes the update of the desktop view 116 of the virtual machine. In one embodiment, the video driver 108 includes and Application Programming Interface (API) for updating the desktop view 116. Further, the video player 106 may access the videos from library 112, from an Internet website, or from another video source.

One server may execute a plurality of virtual machines, maybe even thousands of virtual machines. The virtual machines compete for the resources in the server (e.g., processor, memory, networking card, etc.) and on the network. When the resources become scarce, there may be degradation in performance for the virtual machines. The degradation may include lack of responsiveness to user commands and slow display updates. In addition, there could be also network constraints that could affect the responsiveness of the remote display. Embodiments presented herein provide information to a system administrator regarding the performance of remote clients, and more specifically of remote displays.

Display protocol 120 transmits display updates to the remote desktop application 124 in client 104. At the client 104 side, the remote desktop application 124 receives the display data and updates a display buffer (not shown) with data for remote desktop view 126. Remote desktop application 124 provides the content of the display buffer to a display, which may be integrated within, or connected to, client 104.

When remote display protocol 120 transfers the display data, the protocol is using two important resources: Central Processing Unit (CPU) and network bandwidth. If there are enough resources available, video display quality will usually be good. But oftentimes this is not the case because the physical CPU on the datacenter blade is typically shared across different users and may be heavily utilized. In addition, the network link is also shared and limited in a WAN environment. Network adaptive compression protocols may alleviate the problem, but this is not enough in many scenarios. In this case, the remote display quality may deteriorate. Sometimes, the display protocol compresses display data before transfer to lower resource use. This compression helps to save resources, but sometimes the compression lowers display quality.

Embodiments presented herein, perform quality measurements to determine the quality of the remote desktop view. In one embodiment, the video quality manager 118 inserts performance markers (e.g., macroblocks, described in more detail below) in desktop view 116. The performance markers are then analyzed by video quality agent 122 in client 104 to determine the quality of the video transmission. In another embodiment, the received macroblocks at the client 104 are sent to another device for analysis (e.g., a display quality server) to calculate the quality metric.

A video encoder 114 calculates the values for the performance markers and inserts the performance markers in one or more videos of video library 112. Additionally, video encoder 114 may insert the performance markers in real time as video player 106 produces video frames for desktop view 116. For example, a display API call can be intercepted by video quality manager 118 using known interception techniques, and the performance markers generated by video encoder 114 are inserted into the video stream. In one embodiment, the API is provided by the guest operating system (GOS) 110, but the embodiments presented herein may be utilized with any API and any OS. The API call causes a change in the desktop view 116 for the virtual machine. The video frames with the performance markers are then transmitted by display protocol 120 to the remote client 104.

Figure 2:
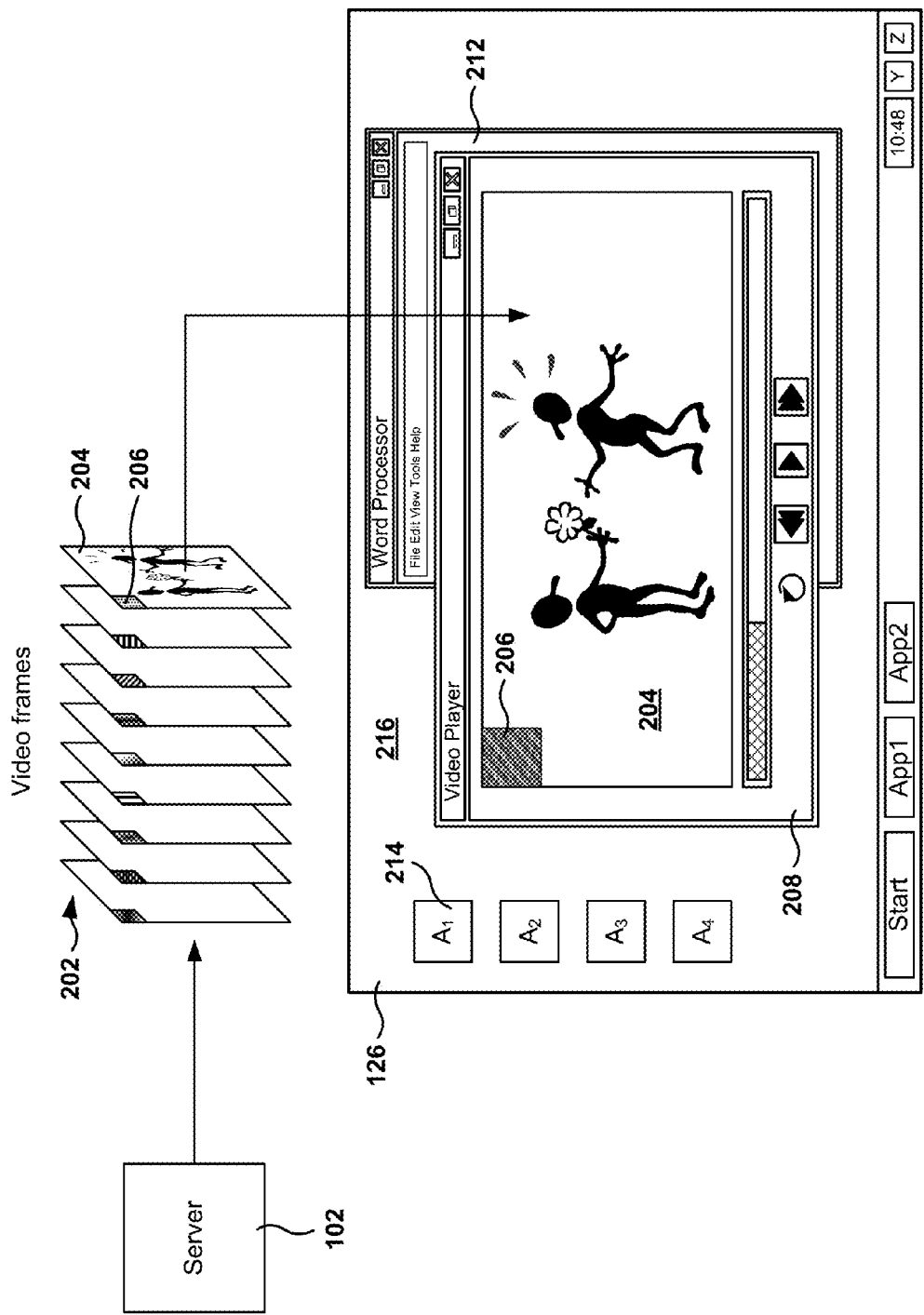
FIG. 2 illustrates the transmittal of video frames with embedded macroblocks, according to one embodiment.

FIG. 2 illustrates the transmittal of video frames with embedded macro blocks, according to one embodiment. In one embodiment, two metrics are utilized for measuring remote video quality: the received frame rate of video frames received at the client, and the image quality of the video received. The image quality of the video received refers to the pixel information displayed on the remote display. Perfect quality would mean that the pixels of the original video being played at the server are the same pixels being displayed on the remote display.

It is difficult to objectively evaluate the video quality while video is playing in the remote VDI environment. In one embodiment, the remote video quality is calculated by determining the image quality for a plurality of received video frames, and then an overall quality metric is calculated based on the image quality for the plurality of received video frames.

There are different methods for calculating the image quality based on the comparison between a received copy and the intended (e.g., transmitted) copy. In one embodiment, the Peak Signal-to-Noise Ratio (PSNR) is used. PSNR defines the ratio between the maximum possible power of a signal and the power of corrupting noise that affects the fidelity of its representation. Because many signals have a very wide dynamic range, PSNR is usually expressed in terms of the logarithmic decibel scale. PSNR is defined via the mean squared error (MSE). Given a noise-free m×n monochrome image I and its noisy approximation K, MSE is defined as:

$$MSE = \frac{1}{mn}\sum_{i=0}^{m-1}\sum_{j=0}^{n-1}[I(i, j) - K(i, j)]^2$$

PSNR is defined as:

$$PSNR = 10 \cdot \log_{10}\left(\frac{MAX_I^2}{MSE}\right)$$
$$= 20 \cdot \log_{10}\left(\frac{MAX_I}{\sqrt{MSE}}\right)$$
$$= 20 \cdot \log_{10}(MAX_I) - 10 \cdot \log_{10}(MSE)$$

Where $MAX_I$ is the maximum possible pixel value of the image. For color images with three RGB values per pixel, the definition of PSNR is the same except the MSE is the sum over all squared value differences divided by image size and by three.

In other embodiments, other methods may be utilized, such as Data Compression Ratio, the Perceptual Evaluation of Video Quality (PEVQ), Signal-to-Noise ratio (S/N), Structural Similarity (SSIM), etc. These and other image quality metrics are well known in the field, the use of any of which suitable ones is contemplated.

In one approach, a small reference image is located in a specified location in the desktop, and this reference image is changed with every frame of video. Then the quality of the received reference image on the client side is measured to determine a video quality metric. The downside of this approach is that video quality and reference image quality can be different as encoded by the protocol, and there may be additional display data being transferred to the remote client together with the reference images. In order to overcome this problem, in one embodiment, performance markers are inserted in a video stream of a video being played on the desktop. Therefore, the performance markers are inserted in the video stream itself instead of in some part of the desktop unrelated to the video streaming.

In one embodiment, the macroblock inserted in a video frame is determined based on a formula. In other words, the macroblocks are deterministic and not random because of the use of one or more formulas. This way, the agent for measuring performance in the remote client can identify the expected values for the macroblock, based, in one embodiment, in the frame number of a received video frame. This way, the received macroblock is compared to the expected macroblock (i.e., the one calculated with the one or more formulas) to determine the quality of the video frame.

In general, any formula or algorithm may be used to determine the macroblock, as long as the same formula or algorithm is used at the remote client to determine the expected values of the macroblock embedded in a video frame. More details about calculating a macroblock using a formula are provided below with reference to FIG. 3. For example, in another embodiment, a library of macroblocks may be defined, and the frame number is used to index the library and determine the expected macroblock. The library of macroblocks is the same in the client as in the server in order to be able to perform the comparison.

The remote desktop view 216 may include graphic elements for the Graphical User Interface (GUI) supported by the GOS. For example, the remote desktop view 216 may include desktop icons 214, and one or more windows 208 and 212. In the embodiment of FIG. 2, the video player is executing in window 208, and in another embodiment, the video player may be displayed in full screen mode for testing purposes. The video player window 208 includes video display area 204, where the video frames are presented.

While testing the quality, video frames include a macroblock 206. Server 102 transmits a video stream 202 to the remote desktop, which is then shown in the appropriate area of the display (e.g., within window 208). In one embodiment, each video frame in the video stream 202 includes a different macroblock.

In one embodiment, the macroblocks are pre-encoded in the video stream, so to initiate the performance measurement, the video with the pre-encoded macroblocks is played on a video player. In another embodiment, the macroblocks may be embedded as the stream is being sent to the remote display, as described in more detail with reference to FIG. 5.

Figure 3:
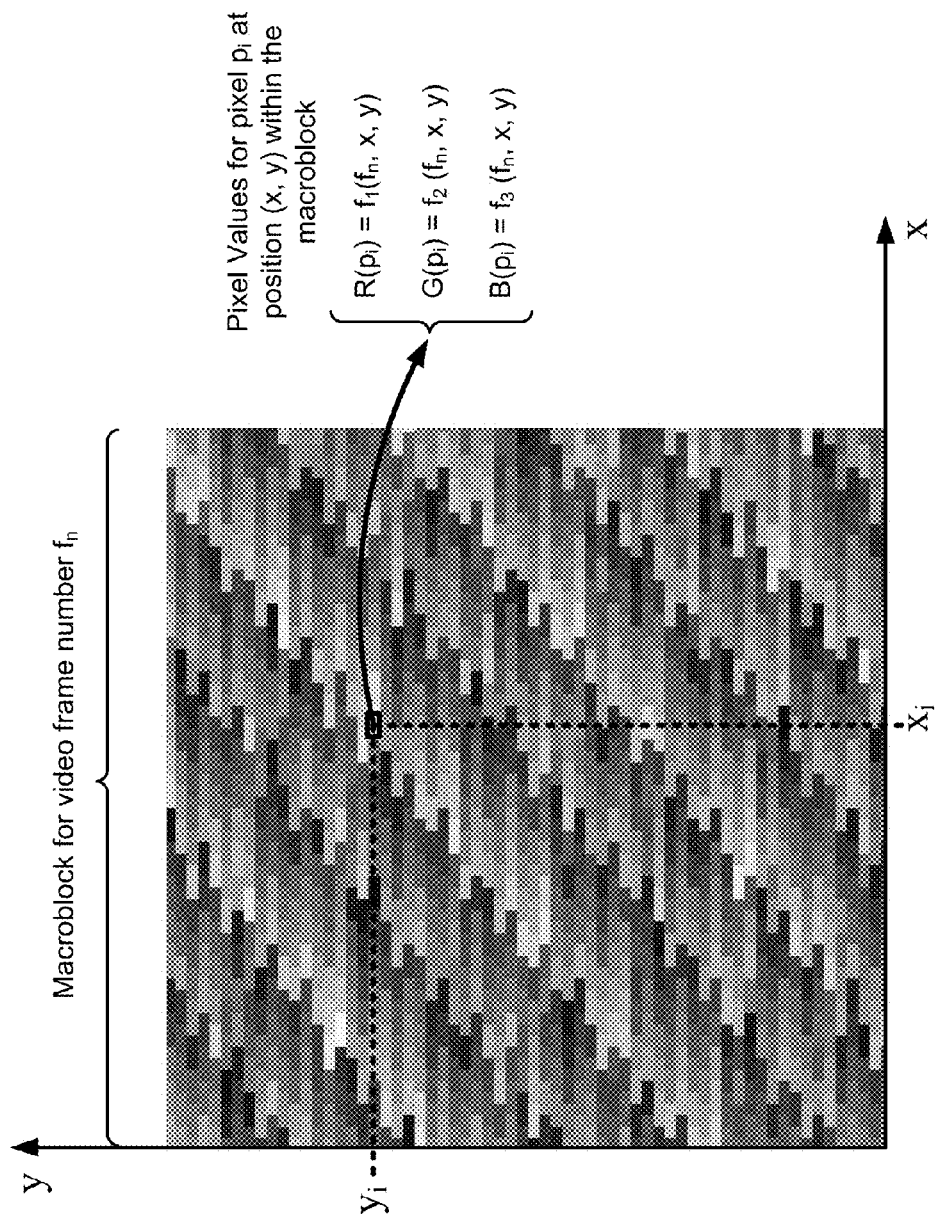
FIG. 3 illustrates the calculation of a macroblock, according to one embodiment.

FIG. 3 illustrates the calculation of a macroblock, according to one embodiment. The performance marker is, in one embodiment, a macroblock, which is a group of pixels within a rectangle or a square. Other types of macroblocks may be utilized, such as lines, circles, triangles, etc., as long as the client and the server are aware of the shape and location of the macroblock.

In one embodiment, the macroblock is located in the same place in all video frames, but in other embodiments, the macroblock location may change from frame to frame. In this case, the location of the macroblock may be determined according to a formula based on the frame number. As long as the client and the server are aware of the location of the macroblock, the macroblock may be located anywhere between a video frame.

In one embodiment, the macroblock has a size of 64×64 pixels, but other macroblocks may have other sizes (e.g., 4×4, 8×8, 8×16, 32×32, 32×64, 64×32, etc.). FIG. 3 illustrates a sample 64×64 macroblock for a given frame number $f_n$.

In one embodiment, each pixel within the macroblock is encoded with the RGB color model. The RGB color model is an additive color model in which red, green, and blue light are added together in various ways to reproduce a broad array of colors. The name of the model comes from the initials of the three additive primary colors, red, green, and blue. Therefore, each pixel has a red value, a green value, and a blue value. In one embodiment, each color value is encoded with eight bits, but other embodiments may utilize other values, such as 16 bits, 32 bits, etc.

In one embodiment, each color value is calculated with a different formula which is a function of the frame number within the video stream, and the pixel coordinates x and y within the macroblock. Therefore, the pixel values are encoded with the following formulas:

$$R(p_i) = f_1(n, x, y) \quad (1)$$

$$G(p_i) = f_2(n, x, y) \quad (2)$$

$$B(p_i) = f_3(n, x, y) \quad (3)$$

Where $R(p_i)$, $G(p_i)$, $B(p_i)$ are the red, green, and blue values, respectively, for pixel $p_i$, and $f_1$, $f_2$, and $f_3$ are the respective functions for calculating these values. Further, $f_1$, $f_2$, and $f_3$ are a function of the frame number n, and the coordinates of pixel $p_i$ (x, y).

The macroblock changes from frame to frame and appears to be a random group of pixels. However, the macroblock is deterministic because is calculated based on a formula. The client can replicate the same calculation in order to determine the expected pixel values in the macroblocks.

In another embodiment, the pixel values of the macroblocks are calculated with the following equations:

$$R(p_i) = ((k_1 \cdot n + k_2 \cdot x + k_3 \cdot y) \text{modulo } k_4) \text{ AND } 0xFF \quad (4)$$

$$G(p_i) = ((k_5 \cdot n + k_6 \cdot x + k_7 \cdot y) \text{modulo } k_8) \text{ AND } 0xFF \quad (5)$$

$$B(p_i) = ((k_9 \cdot n + k_{10} \cdot x + k_{11} \cdot y) \text{modulo } k_{12}) \text{ AND } 0xFF \quad (6)$$

Where $k_1$-$k_{12}$ are predetermined constants, modulo is the mathematical function that calculates the remainder obtained when dividing one number by another, and "AND" is a logical Boolean function. In one embodiment, $k_4$, $k_8$, and $k_{12}$ are prime numbers. In another embodiment, $k_1$-$k_{12}$ are all different prime numbers, but other values are also possible.

In one embodiment, $k_1$-$k_{12}$ have the following values:
$k_1$=345; $k_2$=410; $k_3$=909; and $k_4$=419;
$k_5$=219; $k_6$=888; $k_7$=408; and $k_8$=467;
$k_9$=404; $k_{10}$=866; $k_{11}$=650; and $k_{12}$=547.

In other embodiments, other values are also possible.

Since adjacent pixels have close x and y values, equations (4)-(6) generate miniblocks with gradual color changes, with the modulo function affecting the location of the edges of the miniblocks. In one embodiment, this gradient of colors is avoided by utilizing two vectors $V_x[n]$ and $V_y[n]$ of n values that includes the first n natural integers in unsorted order (e.g., 15, 7, 16, 9, . . . ). Equations (4)-(6) are then modified by replacing x for $V_x[x]$ and y for $V_y[y]$. This way, adjacent pixel values may have very different pixel values within the macroblock.

When the video is played during testing, the client finds out the frame number and generates the expected macroblock. Due to lossy compression or some other transmission factor, the received pixels may be different from the encoded pixels in the transmitted macroblock. By using image comparison techniques, such as PSNR and structural similarity (SSIM), etc., a quality metric is calculated by comparing the expected values against the received values of the macroblock.

In one embodiment, sampling is utilized to calculate image quality, by selecting a plurality of pixels within the macroblock and then calculating the image quality for the chosen pixels. This way, image quality can be calculated on real-time and with low overhead.

It is noted that the embodiments illustrated in FIG. 3 are exemplary. Other embodiments may utilize different formulas, macroblock sizes, color encoding models, etc. The embodiments illustrated in FIG. 3 should therefore not be interpreted to be exclusive or limiting, but rather exemplary or illustrative.

Figure 4:
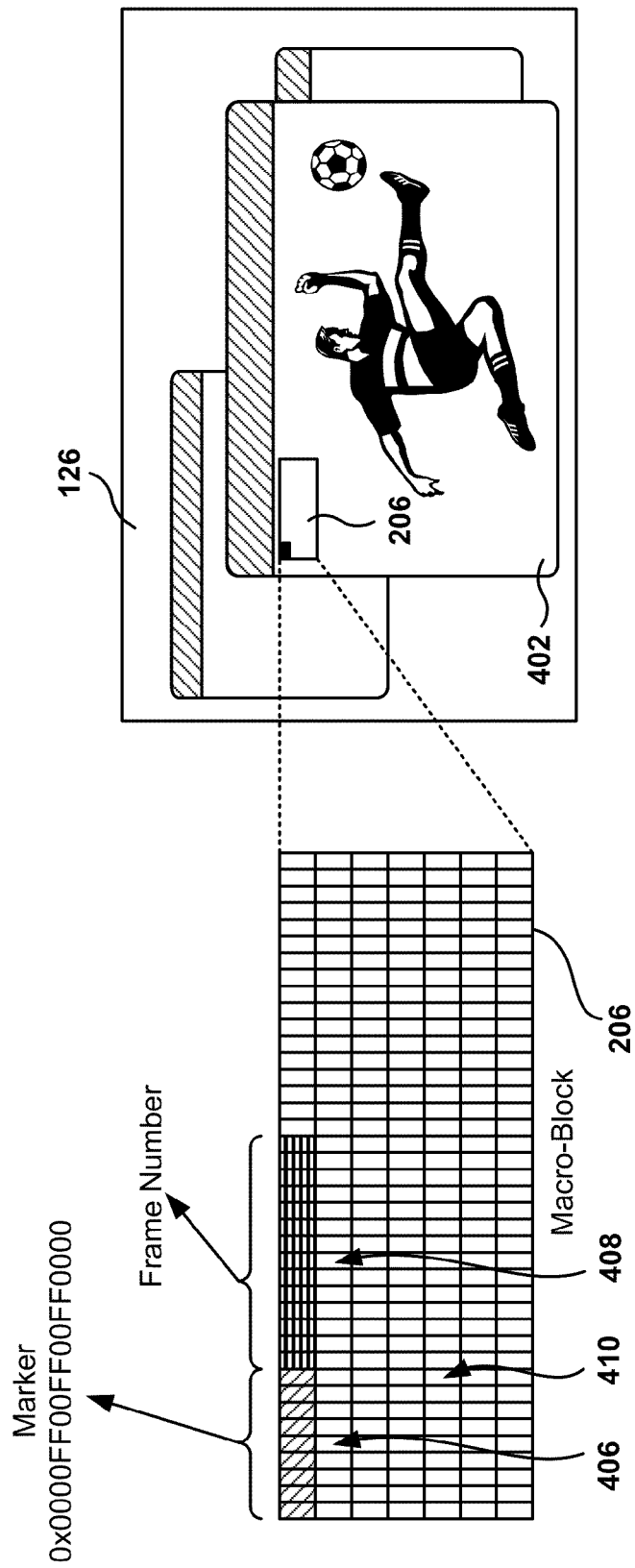
FIG. 4 illustrates an embodiment for transmitting encoded information in the pixels of a video communication.

FIG. 4 illustrates an embodiment for transmitting encoded information in the pixels of a video communication. In one embodiment, some of the pixels of the macroblock include metadata about the video frame, such as the frame number of the video frame. This means, that the equations (1)-(6) are not utilized for the pixels that carry metadata. In another embodiment, the metadata for the video frame is encoded in pixels outside the macroblock.

In the embodiment of FIG. 4, macroblock 206 is embedded inside window 402 of display 126. Macroblock 206 includes marker 406, metadata 408, and encoded pixels 410 (e.g., encoded with equations (4)-(6)). It should be appreciated that macroblock 206 in FIG. 4 is an exemplary arrangement and other embodiments may utilize different components, a subset of the components, or the same components in different order. The embodiment illustrated in FIG. 4 should therefore not be interpreted to be exclusive or limiting, but rather exemplary or illustrative.

Pixels inside marker 206 can have one of three values according to one embodiment:
1. Red <0xff0000>,
2. Green <0x00ff00>, or
3. Blue <0x0000ff>.

These three particular colors have bytes components that are either 0xff or 0x00. Even if there is a lossy compression in a particular protocol, the final color value after decompression would not change drastically since the protocol has to provide a similar-look screen on the client side. For example, if byte 0x00 changes to 0x3a after decompression, using an appropriate deviation threshold can be used to mask this undesired noise. In one embodiment, the deviations from the expected values are recorded as an additional measure of the quality of the video received.

Video metadata 408 is encoded in similar fashion. In one embodiment, a frame number is encoded using bytes 0xff or 0x00. Each bit of the frame number is encoded in one byte of the pixel values. For example, if the maximum frame number can be represented in n bits, then the bit wise representation of the frame number is noted as $\{b_0 b_1 \ldots b_n\}$. If bit $b_i$ has a binary value of 1, then $b_i$ is encoded as 0xff and if $b_i$ has a binary value of 0, then $b_i$ is encoded as 0x00. Thus, each frame number is encoded as a sequence of 0xff and 0x00. This encoding is useful when reconstructing the frame numbers on the client side since the appropriate thresholds are used to mask noise that was generated in lossy compression, or noise due to any other transmittal factor.

In other embodiment, each bit is encoded in a plurality of bytes from the pixel data. In yet another embodiment, each bit of information is encoded in one sub-pixel of the pixel data. The sub-pixel is represented as an intensity value for a color component of one pixel. Typically, the sub-pixel defines intensity information for a red, green, or blue component of the pixel. For 24 bit "Truecolor" where each sub-pixel is encoded as one byte (8 bits) of pixel data, then each bit is encoded in one byte, but if the sub-pixel requires a different amount of storage, then each bit would be encode using the amount of storage required for the sub-pixel. For example, in 16-bit "Highcolor," the red and blue sub-pixels may be encoded with 5 bits of data each, whereas the green sub pixel is encoded with 6 bits.

Some video and image compression algorithms rely on a technique known as chroma subsampling, wherein chroma, or color information, is sampled at a lower resolution than the luma, or brightness information. In this case, using sub-pixel information might be unreliable for individual pixel data. Where chroma subsampling is used, each bit of information may be encoded using an overall intensity of the pixel, rather than discriminating on the basis of sub-pixel information. In this case, white and black pixels may be used so that each pixel correlates to one bit of information. Various techniques can be implemented to obtain an accurate overall intensity value. For example, since the green color component carries most intensity information, the green color component for each pixel can be used alone to identify the bit value.

Note that the above encoding is exemplary and many modifications thereto, would occur to a person of ordinary skill in the art having benefit of this disclosure, and is well within the scope of the embodiments. For example, the previously described process can be used in video data with different color depth and different number of encoded bits per pixel.

Figure 5:
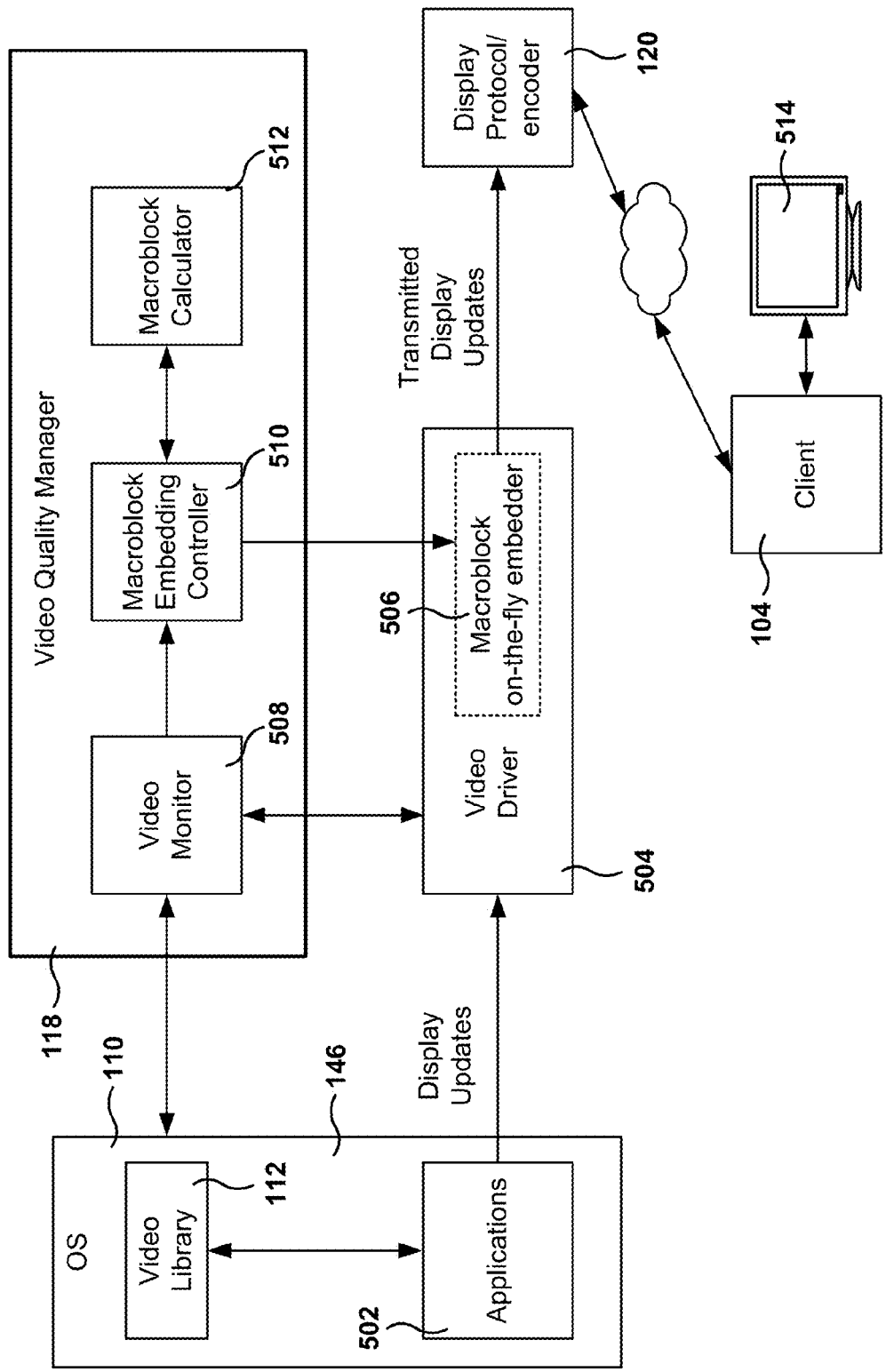
FIG. 5 illustrates a sample architecture for the measurement of video quality displayed on a remote client, according to one embodiment.

FIG. 5 illustrates a sample architecture for the measurement of video quality displayed on a remote client, according to one embodiment. As previously discussed, in one embodiment, the video used for measuring quality is pre-made and includes embedded macroblocks already inserted in each video frame.

In another embodiment, the macroblocks are embedded in real-time, as the video frames are transmitted to the remote client. Video quality manager 118 monitors the activities of the guest OS 110 as well as the video data being transmitted through video driver 504.

Video quality manager 118 includes a video monitor 508, a macroblock embedding controller 510, and a macroblock calculator 512. The video monitor 508 monitors video delivery activities taking place in virtual machines. The video monitor 508 may also update videos in the video library 112 to insert macroblocks in the library videos.

Macroblock embedding controller 510 manages the insertion of macroblocks on-the-fly, and macroblock calculator 512 performs the necessary operations to calculate the values for each of the macroblocks.

Video driver 504 is used by applications to update the display. In one embodiment, a macroblock on-the-fly embedder 506, inside or coupled to video driver 504, inserts macroblocks in the video stream as directed by macroblock embedding controller 510. The modified video stream is then sent by display protocol encoder 120 to the remote client 104 as display updates.

In one embodiment, the location of the macroblock is changed for a plurality of tests. In each test, the macroblock are inserted in a different part of the video, and then the quality measurement is taken for each test. Results for the different tests may be compares to identify how different parts of the video display may be affected by communications constraints.

It is noted that the embodiments illustrated in FIG. 5 are exemplary. Other embodiments may utilize different modules, embed macroblocks by modules within the OS 110, etc. The embodiments illustrated in FIG. 5 should therefore not be interpreted to be exclusive or limiting, but rather exemplary or illustrative.

Figure 6:
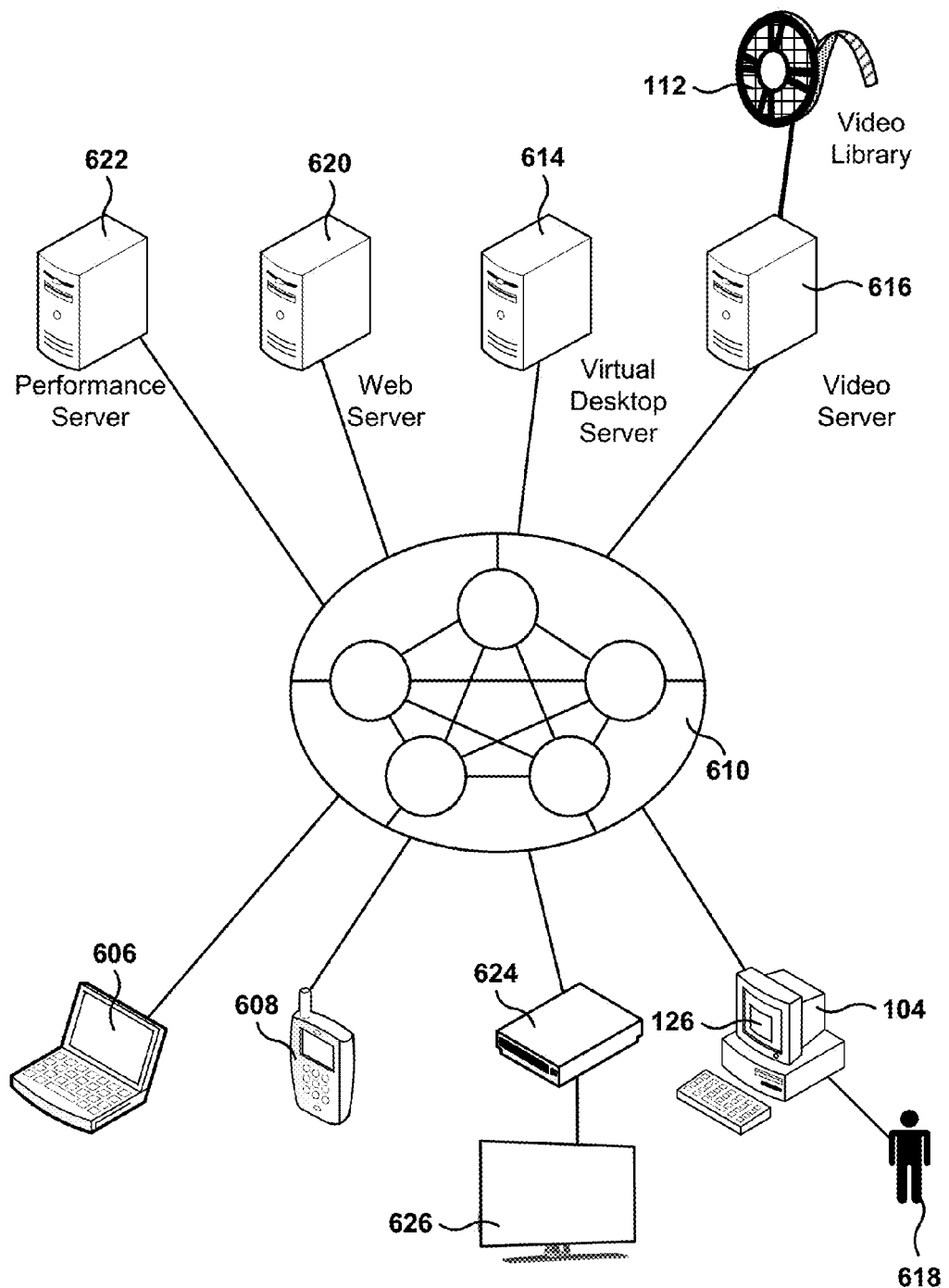
FIG. 6 depicts a remote video playback environment, according to one embodiment.

FIG. 6 depicts a remote video playback environment, according to one embodiment. The environment depicted in FIG. 6 includes virtual desktop server 614 that provides a virtual desktop to remote user 618. Although embodiments of are described within a virtual desktop system, the embodiments presented can be used in other environments with a remote display application transmitting display data to a remote client.

Video server 616 has access to video library 112 that holds a variety of different videos for presentation to user 618. Video server 616 can deliver videos directly to user 618, or can deliver videos to virtual desktop server 614, which in turn delivers videos to user 618. In one embodiment, the video is delivered inside browser window 126 by web server 620.

Performance server 122 collects performance data from servers and clients and analyzes the data collected for presentation to a user. While the different servers are shown separately in FIG. 6, servers 614, 616, 620, and 622 can be combined in one or more servers, or be replicated across a multitude of servers for video delivery optimization. Network 610 transfers data among servers and between servers and clients. Clients for video delivery can be of many types, such as personal computer 104, laptop 106, tablet, mobile phone 108, PDA, TV screen 626 connected to set top box 124, etc.

Embodiments measure the performance of the virtual environment as seen by user 618, or by a plurality of users. The video data is encoded before being transmitted over network 610. The video data can be transmitted using different video encoding methods and protocols, such as PCoIP, Remote Desktop Protocol (RDP) for computers running Microsoft Terminal Services, multimedia streaming technologies such as Adobe's Flash®, Microsoft's Silverlight™, and Digital Multimedia Broadcasting (DMB), digital TV signal transmission protocols, such as Digital Video Broadcasting (DVB), Digital Terrestrial Television (DTT), etc.

Additionally, the embodiments presented are independent of the communications protocols used to transfer display data, thus being able to reliably obtain performance measurements under different topologies and protocols and assess how different factors affect video performance. Further still, the methods presented can scale to tens of thousands of clients and servers without unduly burdening the virtual infrastructure.

Figure 7:
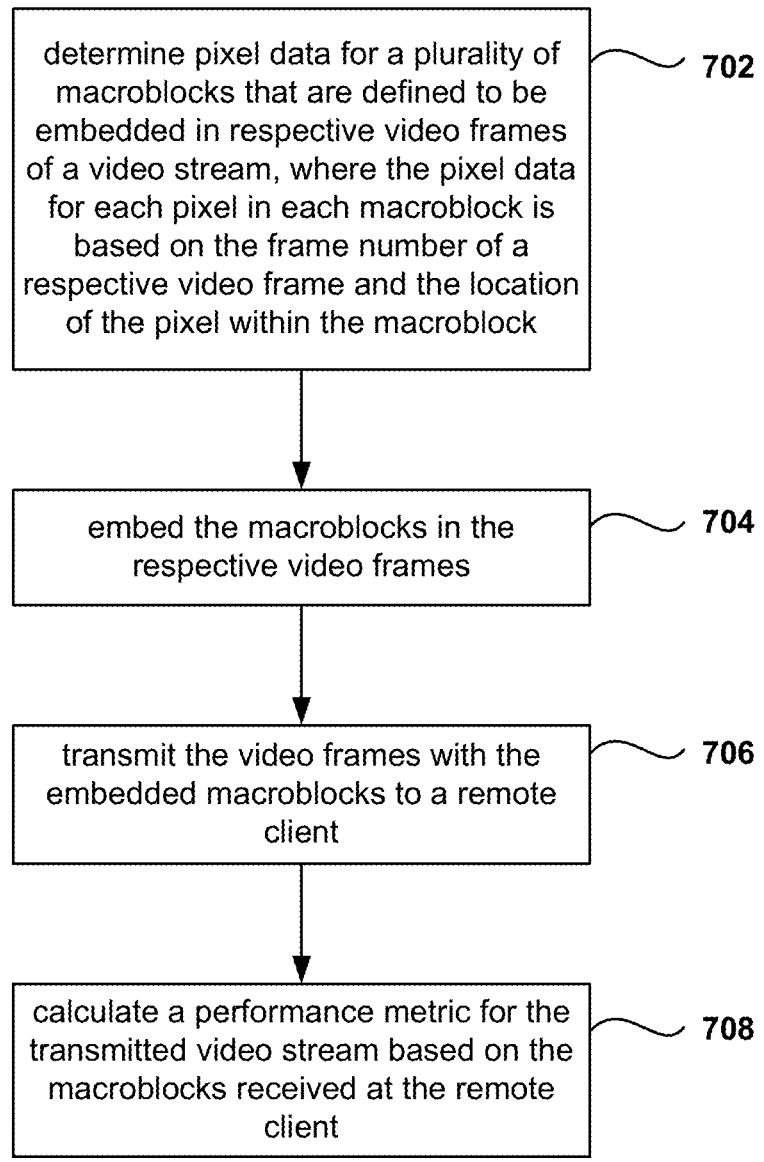
FIG. 7 is a flowchart of a method for measuring remote display performance, according to one embodiment.

FIG. 7 is a flowchart of a method for measuring remote display performance, according to one embodiment. While the various operations in this flowchart are presented and described sequentially, one of ordinary skill will appreciate that some or all of the operations may be executed in a different order, be combined or omitted, or be executed in parallel.

In operation 702, pixel data for a plurality of macroblocks is calculated. Each macroblock has a plurality of pixels (e.g., a rectangular section of pixels), and the macroblocks are defined to be embedded in respective video frames of a video stream. The pixel data for each pixel in each macroblock is calculated based on the frame number of the respective video frame and the location (e.g., coordinates) of the pixel within the macroblock.

From operation 702, the method flows to operation 704 where the macroblocks are embedded in the respective video frames before transmission. In one embodiment, the all the macroblocks are embedded before transmission begins, and in another embodiment, the macroblocks are embedded on-the-fly as the video frames are transmitted to the remote desktop client.

From operation 704, the method flows to operation 706 where the video frames, with the embedded macroblocks, are transmitted to the remote client. From operation 706, the method flows to operation 708 where the performance metric is calculated for the transmitted video stream based on the macroblocks received at the remote client.

Figure 8:
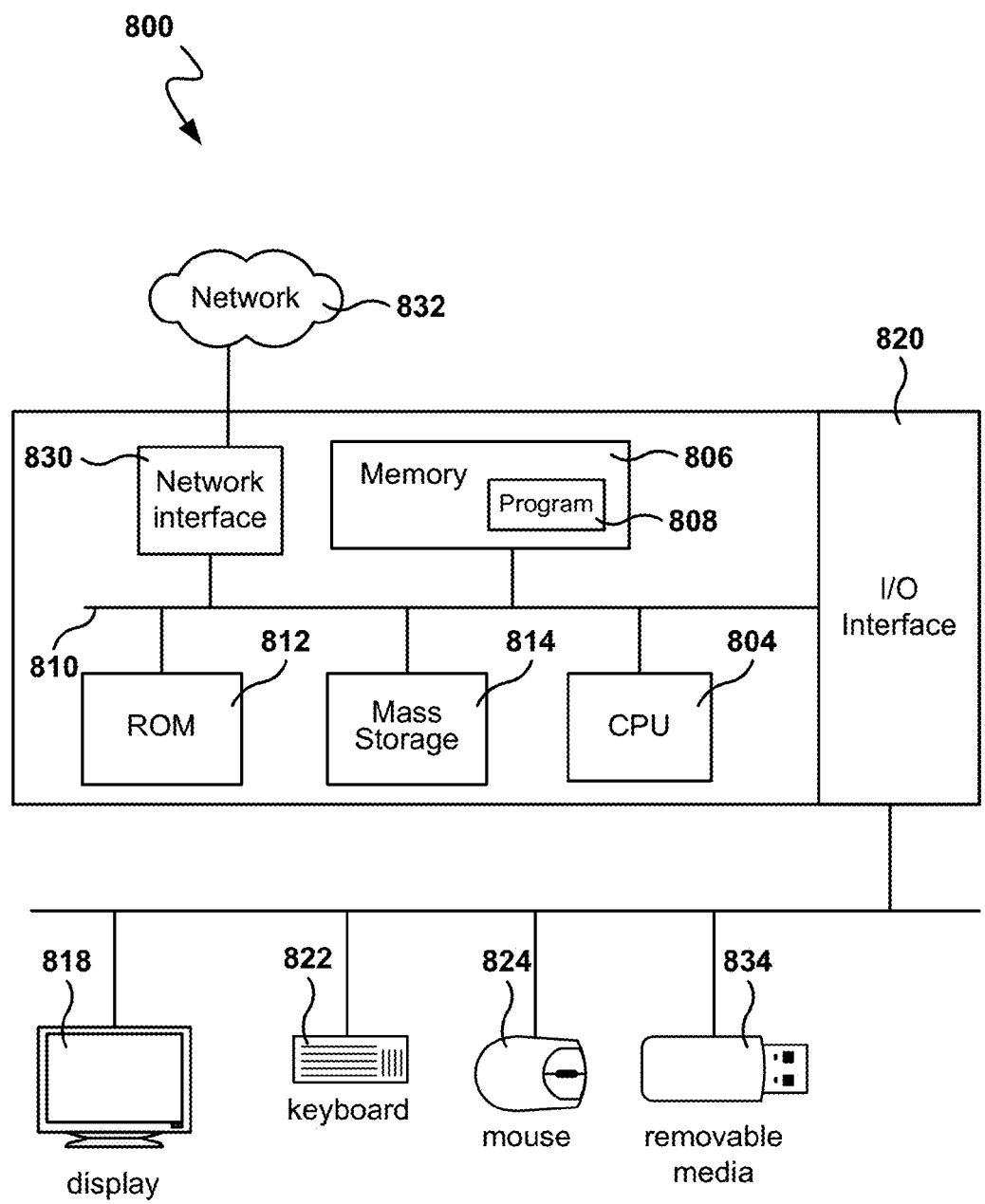
FIG. 8 is a simplified schematic diagram of a computer system for implementing embodiments presented herein.

FIG. 8 is a simplified schematic diagram of a computer system for implementing embodiments presented herein. It should be appreciated that the methods described herein may be performed with a digital processing system, such as a conventional, general-purpose computer system. Special purpose computers, which are designed or programmed to perform only one function may be used in the alternative. The computer system includes a Central Processing Unit (CPU) 804, which is coupled through bus 810 to random access memory (RAM) 806, read-only memory (ROM) 812, and mass storage device 814. Program 808 resides in random access memory (RAM) 806, but can also reside in mass storage 814. Program 808 may include a video quality manager program, such as the one in FIG. 1.

Mass storage device 814 represents a persistent data storage device such as a floppy disc drive or a fixed disc drive, which may be local or remote. Network interface 830 provides connections via network 832, allowing communications with other devices. It should be appreciated that CPU 804 may be embodied in a general-purpose processor, a special purpose processor, or a specially programmed logic device. Input/Output (I/O) interface provides communication with different peripherals and is connected with CPU 804, RAM 806, ROM 812, and mass storage device 814, through bus 810. Sample peripherals include display 818, keyboard 822, cursor control 824, removable media device 834, etc.

Display 818 is configured to display the user interfaces described herein. Keyboard 822, cursor control 824, removable media device 834, and other peripherals are coupled to I/O interface 820 in order to communicate information in command selections to CPU 804. It should be appreciated that data to and from external devices may be communicated through I/O interface 820.

Embodiments may be practiced with various computer system configurations including hand-held devices, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

The methods, systems and embodiments are not limited to any one brand of server or virtualization servers. In one embodiment, a hypervisor partitions physical servers to host multiple virtual machines. Each virtual machine may represent a complete system, with processors, memory, networking, storage and BIOS. The hypervisor enables multiple virtual machines to: (a) share physical resources, (b) run unmodified operating systems and applications, and (c) run the most resource-intensive applications side by side on the same server. Other hypervisors may have similar functionality or more or less functionality. Accordingly, the systems, methods and computer readable media can be practiced using any product, software, or hardware configuration.

With the above embodiments in mind, it should be understood that the embodiments can employ various computer-implemented operations involving data stored in computer systems. These operations are those requiring physical manipulation of physical quantities. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The embodiments can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A method for determining a performance metric corresponding to a video stream transmitted from a server computing device to a remote client, comprising:
    determining pixel data for a plurality of macroblocks, each macroblock having a plurality of pixels, the macroblocks defined to be embedded in respective video frames of the video stream, wherein the pixel data for each pixel in each macroblock is based on a frame number of a respective video frame and a location of the pixel within the macroblock; wherein determining pixel data further includes: calculating RGB values for each pixel, the RGB values including a red value, a green value, and a blue value;
    embedding the macroblocks in the respective video frames;
    transmitting the video frames with the embedded macroblocks to the remote client, wherein the video frames are displayed on the remote client;
    wherein the remote client calculates expected macroblocks; and
    wherein the performance metric for the transmitted video stream is calculated based on a comparison of the macroblocks received at the remote client and the expected macroblocks, wherein operations of the method are executed by a processor.

2. The method as recited in claim 1, wherein calculating RGB values for each pixel further includes:
    calculating the red value as $((k_1 \cdot n + k_2 \cdot x + k_3 \cdot y)$ modulo $k_4)$ AND 0xFF;
    calculating the green value as $((k_5 \cdot n + k_6 \cdot x + k_7 \cdot y)$ modulo $k_8)$ AND 0xFF; and
    calculating the blue value as $((k_9 \cdot n + k_{10} \cdot x + k_{11} \cdot y)$ modulo $k_{12})$ AND 0xFF,
    wherein $k_1$-$k_{12}$ are predetermined constants, n is the frame number, and x and y are coordinates of the pixel within the macroblock.

3. The method as recited in claim 2, wherein a location of each macroblock within the respective video frame is different from a location of the macroblock inserted in a previous video frame.

4. A method for determining a performance metric corresponding to a video stream transmitted from a server computing device to a remote client, comprising:
    determining pixel data for a plurality of macroblocks, each macroblock having a plurality of pixels, the macroblocks defined to be embedded in respective video frames of the video stream, wherein the pixel data for each pixel in each macroblock is based on a frame number of a respective video frame and a location of the pixel within the macroblock;
    embedding the macroblocks in the respective video frames;
    embedding metadata in pixel values of the macroblock;
    transmitting the video frames with the embedded macroblocks to the remote client, wherein the video frames are displayed on the remote client;
    calculating, at the remote client, expected macroblocks; and
    wherein the performance metric for the transmitted video stream is calculated based on a comparison of the macroblocks received at the remote client and the expected macroblocks, wherein operations of the method are executed by a processor.

5. The method as recited in claim 4, wherein the metadata includes a predetermined marker and the frame number.

6. The method as recited in claim 4, wherein calculating the performance metric further includes:
    determining first pixel values for a first expected macroblock based on the frame number of a received video frame and locations of each pixel within the first expected macroblock; and
    comparing the first expected macroblock to a respective received macroblock embedded in the received video frame.

7. The method as recited in claim 4, wherein calculating the performance metric further includes:

calculating the performance metric utilizing a Peak Signal-to-Noise Ratio (PSNR) algorithm based on comparing a received macroblock and an expected macroblock.

8. The method as recited in claim 4, wherein embedding the macroblocks further includes:
   embedding the macroblocks in the video stream; and
   storing the video stream with the embedded macroblocks in permanent storage before transmitting the video frames.

9. A method for determining a performance metric corresponding to a video stream transmitted from a server computing device to a remote client, comprising:
   determining pixel data for a plurality of macroblocks, each macroblock having a plurality of pixels, the macroblocks defined to be embedded in respective video frames of the video stream, wherein the pixel data for each pixel in each macroblock is based on a frame number of a respective video frame and a location of the pixel within the macroblock;
   embedding the macroblocks in the respective video frames;
   transmitting the video frames with the embedded macroblocks to the remote client, wherein the video frames are displayed on the remote client;
   calculating, at the remote client, expected macroblocks; and
   wherein the performance metric for the transmitted video stream is calculated based on a comparison of the macroblocks received at the remote client and the expected macroblocks, wherein operations of the method are executed by a processor;
   wherein embedding the macroblocks further includes:
      intercepting each video frame as the video frame is sent to the remote client; and
      inserting the macroblock in each intercepted video frame before transmitting each video frame.

10. A non-transitory computer-readable storage medium storing a computer program for determining a performance metric corresponding to a video stream transmitted from a server computing device to a remote client, the computer-readable storage medium comprising:
   program instructions for calculating pixel data for a plurality of macroblocks, each macroblock having a plurality of pixels, the macroblocks defined to be embedded in respective video frames of the video stream, wherein the pixel data for each pixel in each macroblock is calculated based on a frame number of the respective video frame and a location of the pixel within the macroblock, wherein calculating pixel data further includes:
      program instructions for calculating RGB values for each pixel, the RGB values including a red value, a green value, and a blue value;
   program instructions for embedding the macroblocks in the respective video frames; and
   program instructions for transmitting the video frames with the embedded macroblocks to the remote client, wherein the video frames are displayed on the remote client, wherein the remote client is configured to:
      calculate expected macroblocks;
      calculate the performance metric for the transmitted video stream based on a comparison of the macroblocks received at the remote client and the expected macroblocks; and
      store the performance metric in memory.

11. The non-transitory computer-readable storage medium as recited in claim 10, wherein calculating RGB values further includes:
   program instructions for calculating the red value as $((k_1 \cdot n + k_2 \cdot x + k_3 \cdot y) \text{ modulo } k_4)$ AND 0xFF;
   program instructions for calculating the green value as $((k_5 \cdot n + k_6 \cdot x + k_7 \cdot y) \text{ modulo } k_8)$ AND 0xFF; and
   program instructions for calculating the blue value a as $((k_9 \cdot n + k_{10} \cdot x + k_{11} \cdot y) \text{ modulo } k_{12})$ AND 0xFF, wherein $k_1$-$k_{12}$ are predetermined constants, n is the frame number, and x and y are coordinates of the pixel within the macroblock.

12. The non-transitory computer-readable storage medium as recited in claim 10, wherein embedding the macroblocks further includes:
   program instructions for embedding the macroblocks in the video stream; and
   program instructions for storing the video stream with the embedded macroblocks in permanent storage before transmitting the video frames.

13. A non-transitory computer-readable storage medium storing a computer program for determining a performance metric corresponding to a video stream transmitted from a server computing device to a remote client, the computer-readable storage medium comprising:
   program instructions for calculating pixel data for a plurality of macroblocks, each macroblock having a plurality of pixels, the macroblocks defined to be embedded in respective video frames of the video stream, wherein the pixel data for each pixel in each macroblock is calculated based on a frame number of the respective video frame and a location of the pixel within the macroblock;
   program instructions for embedding the macroblocks in the respective video frames; and
   program instructions for transmitting the video frames with the embedded macroblocks to the remote client, wherein the video frames are displayed on the remote client, wherein the remote client is configured to:
      calculate expected macroblocks;
      calculate the performance metric for the transmitted video stream based on a comparison of the macroblocks received at the remote client and the expected macroblocks; and
      store the performance metric in memory;
   wherein embedding the macroblocks further includes:
      program instructions for intercepting each video frame as the video frame is sent to the remote client; and
      program instructions for inserting the macroblock in each intercepted video frame before transmitting each video frame.

14. A method for determining a performance metric corresponding to a video stream transmitted from a server computing device to a remote client computing device, comprising:
   receiving, at the client device, a plurality of video frames of the video stream and displaying the video frames on the remote client, each video frame including a respective macroblock embedded in the video frame by the server, each macroblock having a plurality of pixels;
   identifying received pixel data for pixels of each received macroblock;
   determining expected pixel data for pixels of each received macroblock based on the frame number of the video frame and the location of the pixel within the macroblock; and comparing the received pixel data to the expected pixel data for a plurality of pixels to calculate the performance metric for the received video stream, wherein operations of the method are executed by a processor and the performance metric is stored in memory;

wherein determining expected pixel data further includes:

calculating a red value as $((k_1 \cdot n + k_2 \cdot x + k_3 \cdot y) \text{ modulo } k_4)$ AND 0xFF;

calculating a green value as $((k_5 \cdot n + k_6 \cdot x + k_7 \cdot y) \text{ modulo } k_8)$ AND 0xFF; and calculating a blue value a as $((k_9 \cdot n + k_{10} \cdot x + k_{11} \cdot y) \text{ modulo } k_{12})$ AND 0xFF, wherein $k_1$-$k_{12}$ are predetermined constants, n is the frame number, and x and y are coordinates of the pixel within the macroblock.

15. A method for determining a performance metric corresponding to a video stream transmitted from a server computing device to a remote client computing device, comprising:

receiving, at the client device, a plurality of video frames of the video stream and displaying the video frames on the remote client, each video frame including a respective macroblock embedded in the video frame by the server, each macroblock having a plurality of pixels;

identifying received pixel data for pixels of each received macroblock;

determining expected pixel data for pixels of each received macroblock based on the frame number of the video frame and the location of the pixel within the macroblock; and comparing the received pixel data to the expected pixel data for a plurality of pixels to calculate the performance metric for the received video stream, wherein operations of the method are executed by a processor and the performance metric is stored in memory;

wherein the macroblocks are embedded at the server by intercepting each video frame as the video frame is sent to the remote client, and inserting the macroblock before transmitting each video frame.

16. The method as recited in claim 14, wherein operations of the method are performed by a computer program when executed by one or more processors, the computer program being embedded in a non-transitory computer-readable storage medium.

* * * * *